United States Patent
Bousselin et al.

[11] Patent Number: 5,932,166
[45] Date of Patent: Aug. 3, 1999

[54] METHOD AND APPARATUS FOR MANUFACTURING JOINED TUBES

[75] Inventors: Geoffroy Bousselin, Choisy Au Bac; Claude Leviel, Crepy En Valois, both of France

[73] Assignee: Compagnie Plastic Omnium, Lyons, France

[21] Appl. No.: 08/822,754

[22] Filed: Mar. 24, 1997

[30] Foreign Application Priority Data

Mar. 22, 1996 [FR] France ..................................... 96 03631

[51] Int. Cl.⁶ ............................. B29C 49/04; B29C 49/48
[52] U.S. Cl. ........................ 264/534; 264/540; 425/525; 425/532
[58] Field of Search ..................... 264/534, 540; 425/522, 525, 532

[56] References Cited

U.S. PATENT DOCUMENTS

| | | | |
|---|---|---|---|
| 3,342,916 | 9/1967 | Peters | 425/536 |
| 4,038,006 | 7/1977 | Farrell | 425/525 |
| 4,199,129 | 4/1980 | Fischer | 425/525 |
| 4,865,777 | 9/1989 | Weiler et al. | 264/534 |
| 5,049,224 | 9/1991 | Umezawa et al. | 425/525 |
| 5,700,498 | 12/1997 | Renzo et al. | 425/532 |

FOREIGN PATENT DOCUMENTS

| | | |
|---|---|---|
| A-0360220 | 3/1990 | European Pat. Off. . |
| A-0636505 | 2/1995 | European Pat. Off. . |
| 1450716 | 8/1966 | France ..................................... 425/525 |
| A-1478772 | 7/1967 | France . |
| A-2148424 | 3/1973 | France . |
| 59-152822 | 8/1984 | Japan ..................................... 264/534 |

OTHER PUBLICATIONS

Patent Abstracts of Japan, vol. 008, No. 284 (M–348), Dec. 26, 1984.
Patent Abstracts of Japan, vol. 012, No. 416 (M–759), Nov. 4, 1988.
Patent Abstracts of Japan, vol. 011, No. 157 (m–590), May 21, 1987.

*Primary Examiner*—Robert Davis
*Attorney, Agent, or Firm*—Oliff & Berridge, PLC

[57] ABSTRACT

A device and method is provided for manufacturing at least two curved, joined tubes. The method includes extruding, without clamping, a blank in a modifiable-geometry mold cavity and placing the blank in the cavity by means of an entraining air stream, and then modifying the geometry of the mold cavity to clamp the blank and injecting a gas to shape the blank to the mold cavity geometry thus modified to obtain at least two curved, joined tubes. The device includes a mold cavity and at least one moving part for modifying a geometry of the mold cavity. The moving part is displaceable between a retracted position in which a blank can be placed in the mold cavity under the action of an air stream and a blank clamping position to allow formation of at least two curved, joined tubes upon blowing.

12 Claims, 3 Drawing Sheets

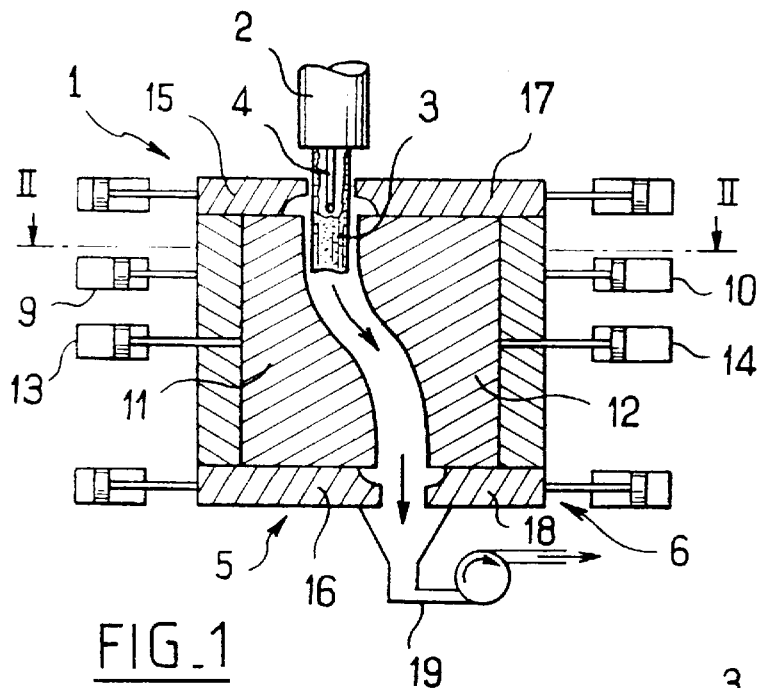
FIG_1
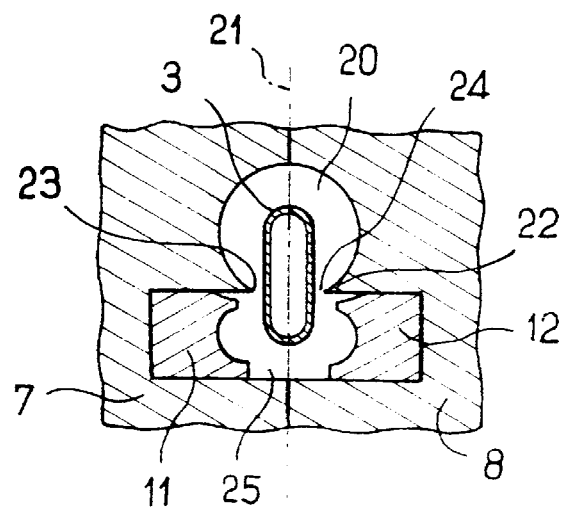
FIG_2
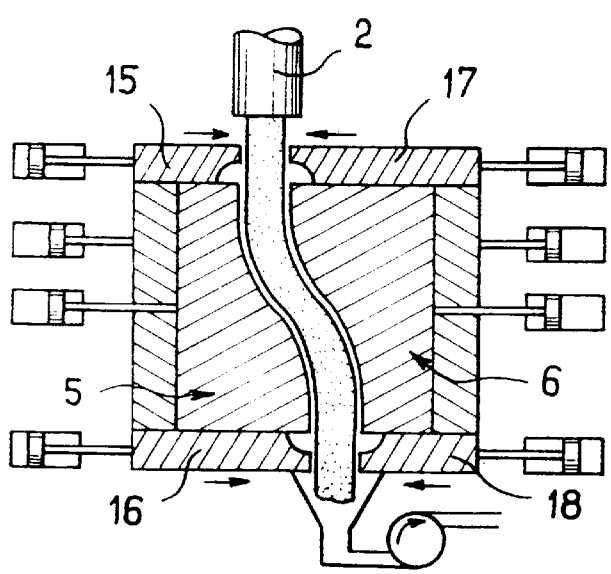
FIG_3

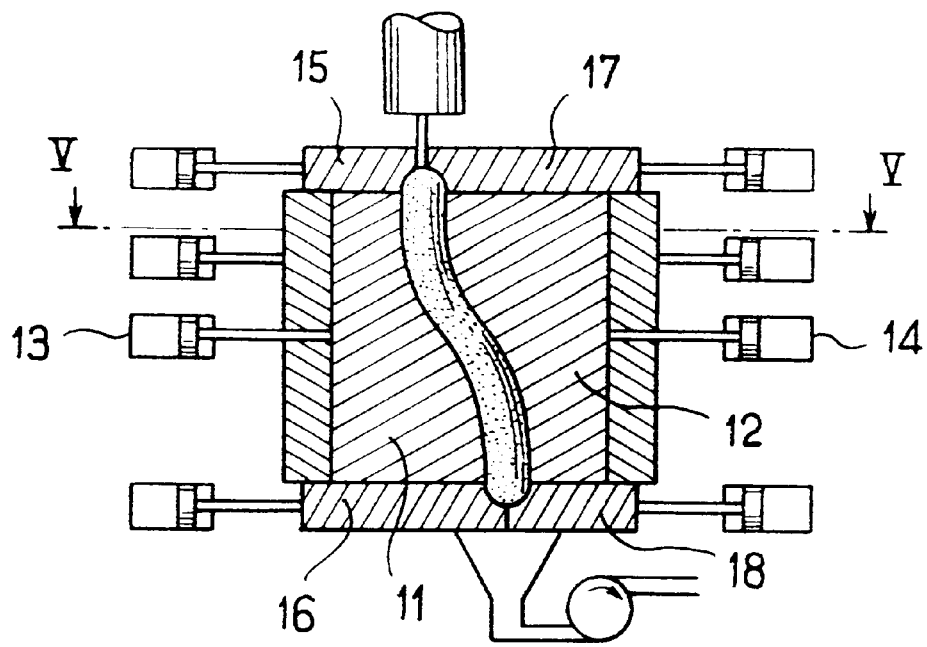
FIG_4
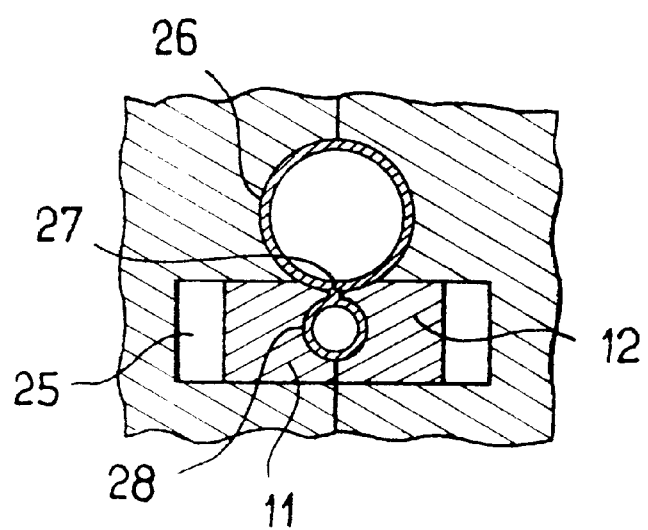
FIG_5

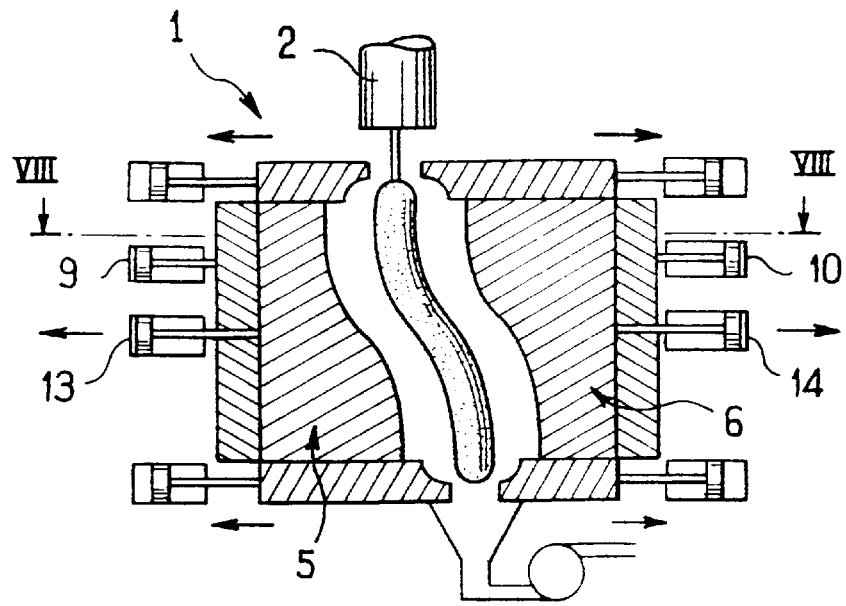
FIG_6
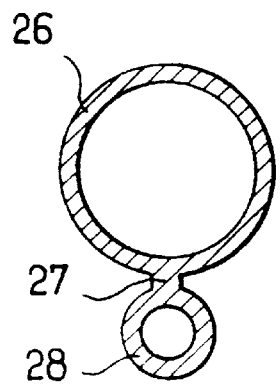
FIG_7
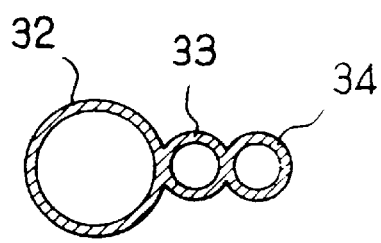
FIG_8

METHOD AND APPARATUS FOR MANUFACTURING JOINED TUBES

BACKGROUND OF THE INVENTION

1. Field of Invention

The present invention relates to the manufacture of hollow plastic bodies by extrusion blow molding, by extruding a blank in a mold cavity then blowing a gas into this blank to shape it to the walls of said cavity.

2. Description of Related Art

It is known that, to produce a curved tube by extrusion blow molding, one can create an air stream to blow the blank into the mold cavity simultaneously with extrusion.

However, this known process is not applicable to manufacture of a bundle of at least two curved, joined tubes because the blank must be clamped in the mold cavity along at least one line parallel to the generatrices of the bundle to produce air tightness between the tubes upon blowing, and such clamping resists displacement of the blank in the mold cavity under the influence of the entraining air stream.

SUMMARY OF THE INVENTION

The invention relates to a novel process for producing a bundle of curved, joined tubes by extrusion blow molding.

The method according to the invention extrudes the blank without clamping in a mold cavity of modifiable geometry, with the blank being placed in the cavity under the action of an entraining air stream. Then, the geometry of the mold cavity is modified to clamp the blank, and a gas is injected to shape the blank to the mold cavity geometry thus modified and to obtain at least two curved, joined tubes.

The invention also relates to a device for producing a bundle of curved, joined tubes by extrusion blow molding. The device according to the invention includes a mold cavity and at least one movable part by which the geometry of the mold cavity can be modified, the movable part being displaceable between a retracted position that allows a blank to be placed in the mold cavity under the influence of an entraining air stream and a blank clamping position to allow at least two curved, joined tubes to be formed when blowing takes place.

Advantageously, the movable part extends lengthwise over substantially the entire length of the mold cavity. It is preferable to use at least two movable parts, one opposite the other, to clamp the blank when they are brought together.

The invention also relates to a multiple-conduit passage for carrying air and/or liquids, produced by implementing the aforementioned process, particularly a passage for filling the fuel tank of an automobile.

BRIEF DESCRIPTION OF THE DRAWINGS

Other characteristics and advantages of the present invention will emerge from reading the detailed description that follows and examining the attached drawings wherein:

FIG. 1 is a schematic view of an extrusion blow molding device according to a preferred embodiment of the invention;

FIG. 2 is a schematic view in a cross section along line II—II in FIG. 1;

FIG. 3 is a view similar to FIG. 1 after the blank has been extruded;

FIG. 4 is a view similar to FIG. 1 as the blank is being blown;

FIG. 5 is a view along line V—V in FIG. 4;

FIG. 6 is a view similar to FIG. 1 as the bundle of joined tubes is being extracted;

FIG. 7 is a cross section through a bundle of joined tubes produced according to the invention; and FIG. 8 is a cross section through a bundle of joined tubes produced according to the invention.

DETAILED DESCRIPTION OF PREFERRED EMBODIMENTS

FIG. 1 shows a device 1 for producing a bundle of curved, joined tubes by extrusion blow molding.

In the particular preferred embodiment described, device 1 allows manufacture of a fuel tank filling passage that consists of two joined tubes of different diameters, as shown in cross section in FIG. 7. This figure shows a large-diameter tube 26 designed to connect the filler neck and the tank and a small-diameter tube 28 designed to serve as a tank vent line, connected to tube 26 by a web of material 27.

With reference once more to FIG. 1, device 1 has an extrusion head 2 that extrudes a blank 3 of substantially oval cross section through an annular aperture. Extrusion head 2 is extended below by two blow nozzles 4 located inside the annular aperture serving for extrusion of the plastic, said nozzles being superimposed in the figures.

Device 1 also has two subassemblies 5 and 6 that between them define a mold cavity extending in a curving path for producing a bundle of curved, joined tubes. Subassemblies 5 and 6 have principal parts 7 and 8 respectively that can move apart under the action of jacks 9 and 10 as well as movable parts 11 and 12 that can be moved together under the action of jacks 13 and 14.

Lower and upper closures comprised of pairs of plates 15, 17 and 16, 18 shut off the mold cavity at its ends when blank 3 is blown. The plates of each closure can be moved toward each other to close off the corresponding ends of the mold cavity by means of the respective jacks shown schematically.

To facilitate movement of blank 3 toward the lower closure comprised of plates 16, 18 during extrusion, a gas, preferably air, is blown through nozzles 4 to create an air stream that tends to entrain blank 3 along the curving path of the mold cavity formed between subassemblies 5 and 6. The gas blown in through nozzles 4 is collected below the lower closure by a suction device 19 that creates a negative pressure at the mold cavity outlet.

Principal parts 7, 8 of subassemblies 5, 6 are in contact along a sealing plane 21 and between them define a cavity 20 of substantially circular cross section to form tube 26 which terminates at an opening 24 provided between edges 22, 23 of cavity 20 in a recess 25 in which movable parts 11 and 12 can move. The movable parts 11 and 12 each have a groove in their faces which are opposite one another. The grooves have arcuate cross sections that form a cavity with a circular cross section to form tube 28 after they have come together.

The space between edges 22 and 23 is sufficient not to impede the motion of blank 3 in the mold cavity and, during extrusion movable parts 11 and 12 are recessed from edges 22, 23 in the retracted position shown in FIG. 2. Thus, blank 3 is not clamped by principal parts 7, 8 or by movable parts 11, 12 and can descend into the mold cavity under the action of the air stream created between the upper and lower ends of the mold cavity.

When extrusion is complete, namely when the lower end of blank 3 has passed plates 16, 18 of the lower closure as shown in FIG. 3, the extrusion process is halted and plates 15, 17 as well as plates 16, 18 come together to close the mold cavity at its upper and lower ends. Plates 15, 17 of the upper closure, when close together, provide two orifices for passage of blow nozzles 4.

Simultaneously with the closing of the closures comprised of plates 15, 17 and 16, 18 or following this closing, movable parts 11, 12 are brought together by actuating jacks 13, 14 as illustrated in FIGS. 4 and 5 to clamp blank 3 and form the bridge of material 27 connecting tubes 26 and 28. The movable parts have surfaces that extend edges 22 and 23 to complete the circular section of cavity 20 (FIG. 2).

Each of blow nozzles 4 terminates in a tubular portion of the blank and these portions will create tubes 26 and 28 after blowing. A pressurized gas is thus blown through one of nozzles 4 into the tubular blank portion contained in cavity 20, the gas forcing the material against the inner surface of this cavity to form tube 26. The other nozzle 4 blows a gas under pressure into the blank tubular portion contained in the cavity provided between moving parts 11 and 12 to force the material against the surface of this cavity to form tube 28.

After blowing and cooling, subassemblies 5, 6 are drawn apart by actuation of jacks 13, 14 and 9, 10 and the lower and upper closures are opened. The part that has just been produced is ejected from the mold and, after the ends have been cut off, a bundle of curved, joined tubes is obtained as shown in cross section in FIG. 7. Device 1 is then ready for producing a new bundle of tubes.

Device 1 advantageously has means for cooling subassemblies 5, 6 after blank 3 has been blown and before the molded part is ejected. These cooling means can be of any type known of itself, omitted from the drawing for purposes of clarity.

In a variant not shown, the blowing air can be injected by means of nozzles located inside subassemblies 5, 6. Placement of the blank in the mold cavity by means of an air stream advantageously avoids premature contact between the blank and the mold cavity and allows molded parts with a smooth surface appearance to be produced.

The process according to the invention uses plastics with relatively low mechanical cohesion in the molten state, such as polyamides for example. Without departing from the framework of the invention, the blank can be formed by simultaneous extrusion of several layers of different materials.

Of course, the invention is not limited to the embodiment just described. The invention can be generalized to manufacturing a bundle of curved tubes with more than two joined tubes, such as for example three joined tubes 32, 33, 34 as shown in the cross section in FIG. 8. A bundle of tubes can also be made in which the tubes have different cross sections, not circular, and variable along the length of the bundle.

What is claimed is:

1. A method for manufacturing at least two curved, joined tubes comprising the steps of:

extruding, without clamping, a blank in a modifiable-geometry mold cavity and placing the blank in the cavity by means of an entraining air stream;

modifying the geometry of the mold cavity to clamp the blank; and injecting a gas to shape the blank to the mold cavity geometry thus modified to obtain at least two curved, joined tubes.

2. A device for manufacturing at least two curved, joined tubes comprising:

a mold cavity;

an extrusion head having at least two blow nozzles; and at least one moving part for modifying a geometry of said mold cavity, said moving part being displaceable between a retracted position in which a blank can be placed in the mold cavity under the action of an air stream and a blank clamping position to allow formation of at least two curved, joined tubes upon blowing, wherein the at least two nozzles are respectively each positioned, after the moving part is moved to the blank clamping position, so as to blow into and facilitate formation of one of the at least two curved, joined tubes.

3. The device according to claim 2, wherein the at least one moving part extends lengthwise over substantially an entire length of the mold cavity.

4. The device according to claim 2, wherein the at least one moving part comprises two moving parts opposed to each other and movable with respect to each other to clamp the blank when the two moving parts are brought together.

5. The device according to claim 3, wherein the at least one moving part comprises two moving parts opposed to each other and movable with respect to each other to clamp the blank when the two moving parts are brought together.

6. A device for manufacturing at least two curved, joined tubes, comprising:

an extrusion head having at least two blow nozzles; and a mold cavity formed by a plurality of movable parts, the plurality of moveable parts being movable between a retracted position in which a blank can be placed in the mold cavity by an air stream and a blank clamping position to allow formation of at least two curved, joined tubes by an air stream from said at least two blow nozzles, wherein the at least two nozzles are respectively each positioned so as to blow into and facilitate formation of one of the at least two curved, joined tubes.

7. The device according claim 6, wherein each of the plurality of movable parts is connected to a jack for moving the respective movable part between the retracted position and the blank clamping position.

8. The device according to claim 7, wherein the plurality of movable parts comprises a plurality of longitudinally extending movable members and a plurality of movable end plates which close off ends of the mold cavity.

9. The device according to claim 8, wherein the plurality of movable parts comprises a pair of opposed movable parts shaped to form one of the at least two curved, joined tubes and a pair of opposed, movable parts shaped to form the other of the at least two curved, joined tubes.

10. The device according to claim 6, wherein the extrusion head is located at a first end of the mold cavity and a suction device is located at a second end of the mold cavity opposite the first end.

11. A device for manufacturing at least two curved, joined tubes, comprising:

means for extruding, without clamping, a blank in a modifiable-geometry mold cavity and for placing the blank in the cavity by means of an entraining air stream;

means for modifying the geometry of the mold cavity to clamp the blank; and means for injecting a gas to shape the blank to the mold cavity geometry thus modified to obtain at least two curved, joined tubes.

12. Apparatus for manufacturing at least two curved, joined tubes, comprising;

means for extruding, without clamping, a blank in a modifiable-geometry mold cavity and placing the blank in the cavity by means of an entraining air stream;

means for modifying the geometry of the mold cavity to clamp the blank and form two substantially tubular cavities; and means for injecting a gas to shape the blank to the mold cavity geometry thus modified to obtain at least two curved, joined tubes.

\* \* \* \* \*